(12) United States Patent
Newell

(10) Patent No.: US 11,384,729 B2
(45) Date of Patent: Jul. 12, 2022

(54) WIND TURBINE

(71) Applicant: Hawkeye Wind LLC, Cheyenne, WY (US)

(72) Inventor: Donald L. Newell, Cheyenne, WY (US)

(73) Assignee: Crossed Arrows Ranch, Inc., Gillette, WY (US)

( * ) Notice: Subject to any disclaimer, the term of this patent is extended or adjusted under 35 U.S.C. 154(b) by 0 days.

(21) Appl. No.: 17/067,031

(22) Filed: Oct. 9, 2020

(65) Prior Publication Data

US 2021/0025366 A1 Jan. 28, 2021

Related U.S. Application Data

(63) Continuation-in-part of application No. 15/588,565, filed on May 5, 2017, now abandoned.

(60) Provisional application No. 62/334,931, filed on May 11, 2016.

(51) Int. Cl.
| | | |
|---|---|---|
| *F03D 7/02* | (2006.01) | |
| *F03D 1/06* | (2006.01) | |
| *F03D 80/70* | (2016.01) | |
| *F03D 13/40* | (2016.01) | |

(52) U.S. Cl.
CPC ........... *F03D 7/0204* (2013.01); *F03D 1/065* (2013.01); *F03D 13/40* (2016.05); *F03D 80/70* (2016.05); *F05B 2240/2211* (2013.01); *F05B 2250/313* (2013.01)

(58) Field of Classification Search
CPC ........ F03D 7/0204; F03D 15/00; F03D 1/065; F03D 80/70; F03D 13/40; F05B 2260/40; F05B 2240/2211; F05B 2250/313
See application file for complete search history.

(56) References Cited

U.S. PATENT DOCUMENTS

| | | | |
|---|---|---|---|
| 414,113 A | 10/1889 | Hostler | |
| 1,142,502 A | 6/1915 | Donnelly | |
| 2,352,089 A | 6/1944 | Fagerlund | |
| 2,376,020 A | 5/1945 | Victoria | |
| 10,072,715 B2 * | 9/2018 | Firkser | F16D 63/006 |
| 2007/0166147 A1 * | 7/2007 | Merswolke | F03D 9/25 |
| | | | 415/4.1 |
| 2010/0026005 A1 * | 2/2010 | Nitzpon | F03D 80/70 |
| | | | 290/55 |

(Continued)

FOREIGN PATENT DOCUMENTS

| | | | |
|---|---|---|---|
| FR | 988861 A | 9/1951 | |
| GB | 226400 A | 12/1924 | |
| WO | WO-2019215466 A1 * | 11/2019 | ........... F03D 7/0204 |

OTHER PUBLICATIONS

U.S. Appl. No. 62/334,931, filed May 11, 2016.

(Continued)

*Primary Examiner* — Woody A Lee, Jr.
*Assistant Examiner* — Jesse M Prager
(74) *Attorney, Agent, or Firm* — Craig R. Miles; CR Miles P.C.

(57) ABSTRACT

A wind driven electric generator including a rotor which intercepts air movement to turn a drive line including a first right angle drive swivelly coupled on the top of a support tower and a second right angle drive located proximate ground level to deliver rotational energy of a drive line to an electric generator located proximate ground level.

15 Claims, 17 Drawing Sheets

(56) References Cited

U.S. PATENT DOCUMENTS

| | | |
|---|---|---|
| 2010/0314873 A1 | 12/2010 | Stone |
| 2012/0286519 A1 | 11/2012 | Yoon |
| 2013/0039767 A1* | 2/2013 | Schrickel .............. F03D 1/0658 |
| | | 416/153 |
| 2013/0168968 A1 | 7/2013 | Dong et al. |
| 2013/0171002 A1* | 7/2013 | Himmelmann ....... F16C 19/548 |
| | | 416/244 R |
| 2015/0361685 A1 | 12/2015 | Abreu et al. |
| 2017/0051722 A1* | 2/2017 | Knoop ................... F03D 1/065 |
| 2017/0321662 A1* | 11/2017 | Minadeo ............... F16C 19/163 |
| 2017/0328341 A1* | 11/2017 | Newell .................. F03D 15/00 |

OTHER PUBLICATIONS

U.S. Appl. No. 15/588,565, filed May 5, 2017.
U.S. Appl. No. 15/588,565, Office Action dated May 1, 2019.
U.S. Appl. No. 15/588,565, Office Action dated Sep. 4, 2019.
U.S. Appl. No. 15/588,565, Office Action dated Apr. 13, 2020.

* cited by examiner

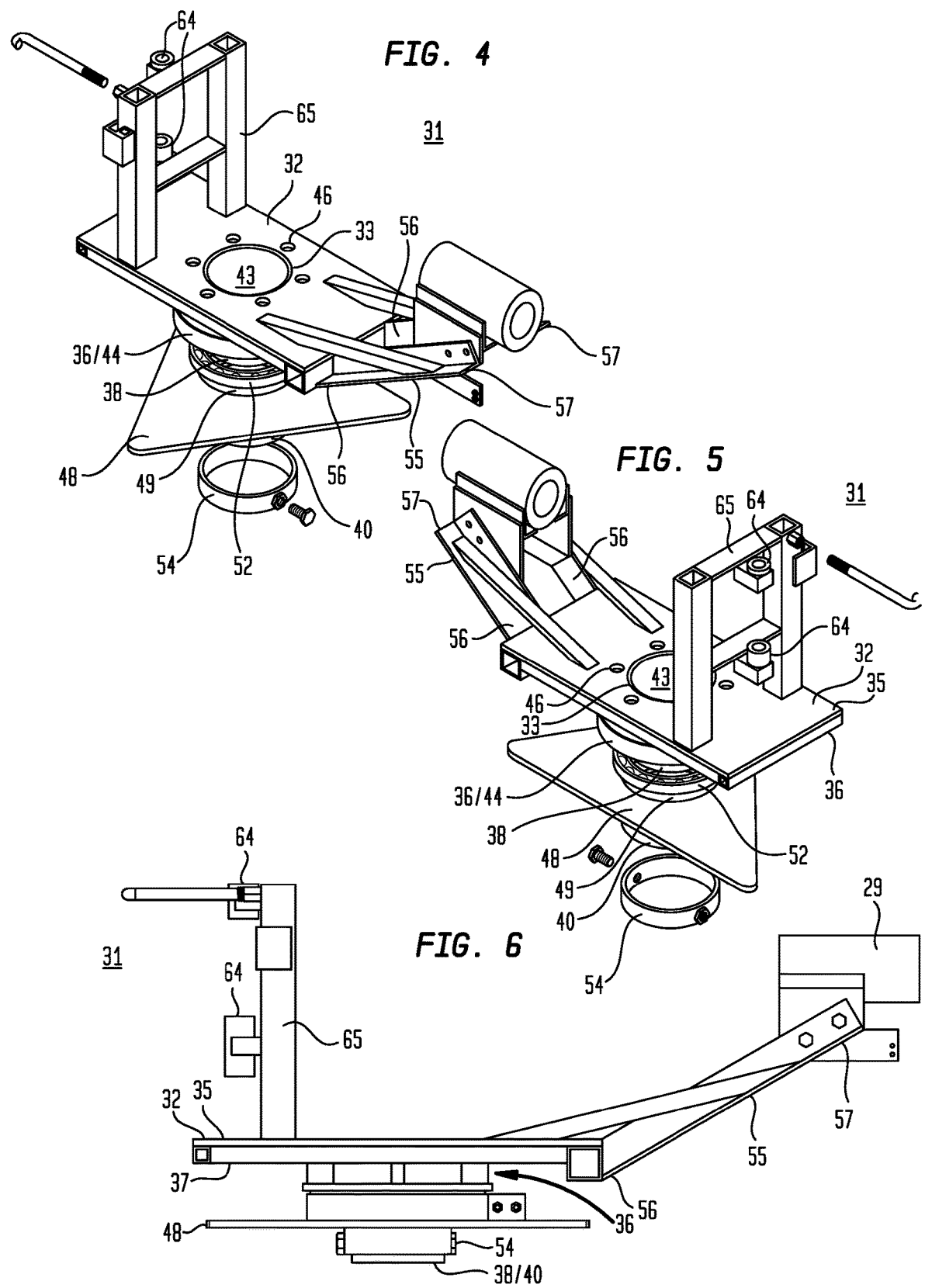

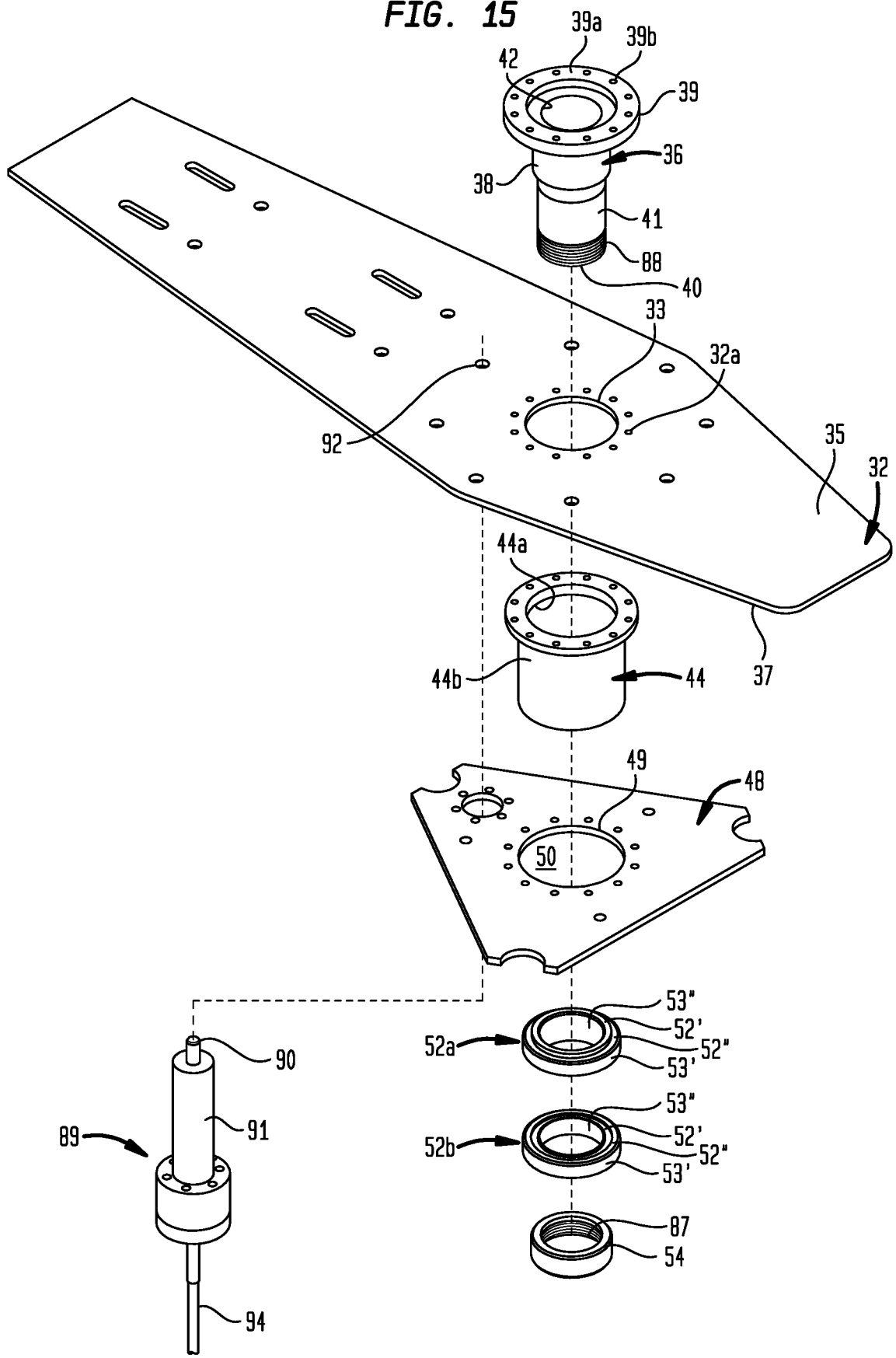

FIG. 19
FIG. 20
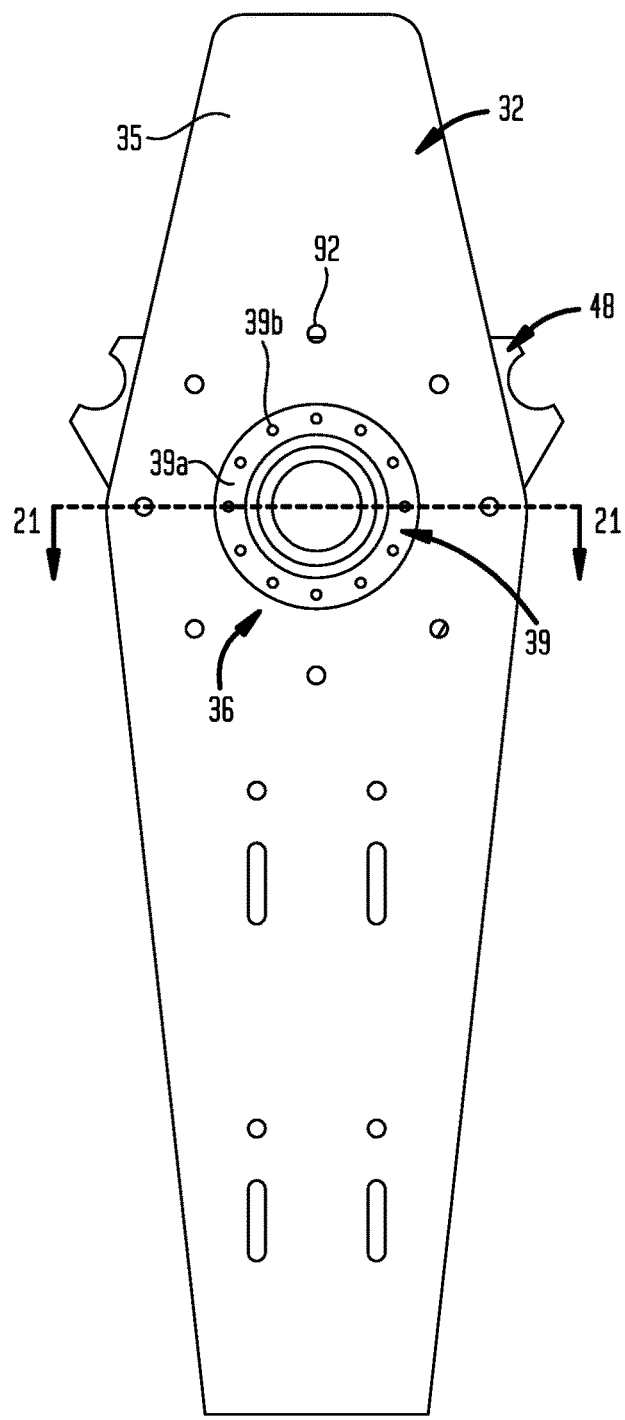
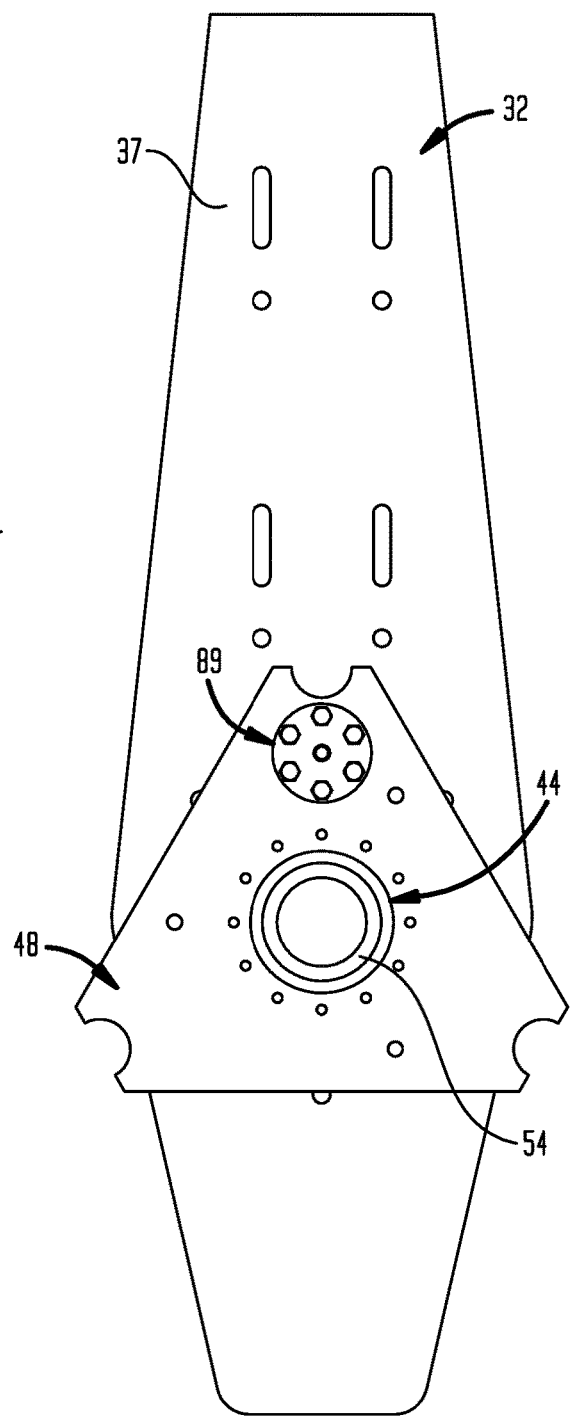

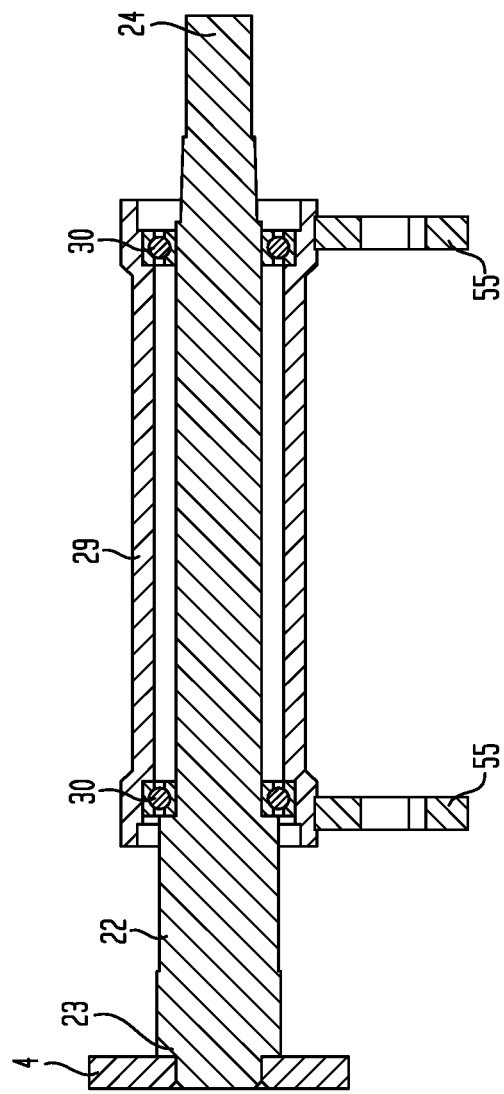
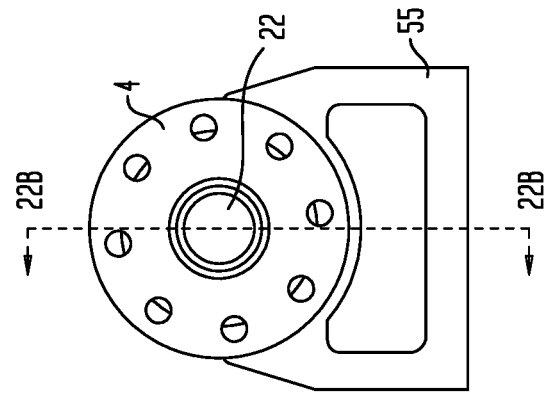
FIG. 22B
FIG. 22A

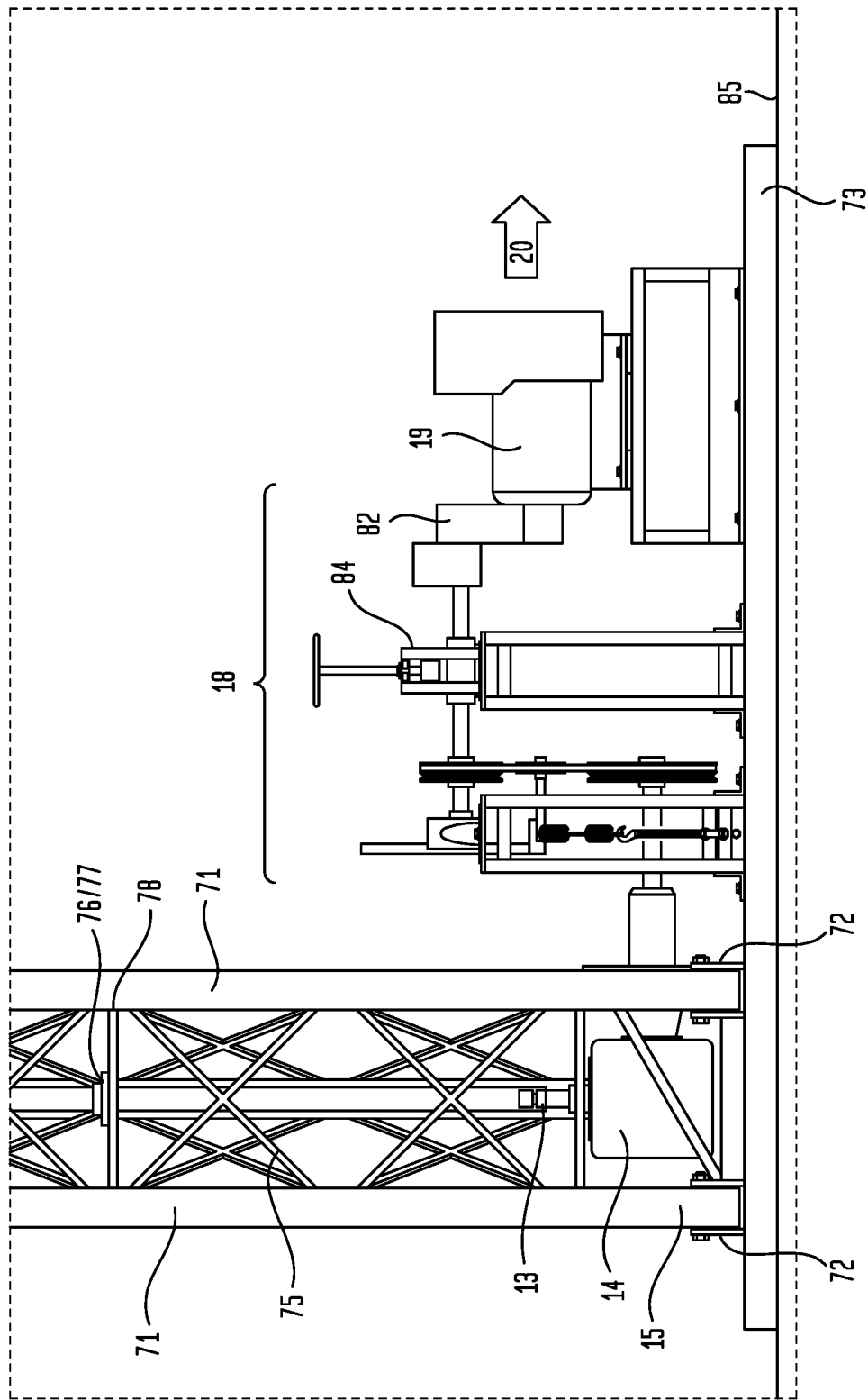

WIND TURBINE

This United States Patent Application is a continuation-in-part of U.S. patent application Ser. No. 15/588,565, filed May 5, 2017, which claims the benefit of U.S. Provisional Patent Application No. 62/334,931, filed May 11, 2016, each hereby incorporated by reference herein.

I. FIELD OF THE INVENTION

A wind driven electric generator including a rotor which intercepts air movement to turn a drive line including a first right angle drive swivelly coupled on the top of a support tower and a second right angle drive located proximate ground level to deliver rotational energy of a drive line to an electric generator located proximate ground level.

II. BACKGROUND OF THE INVENTION

Conventional wind turbines include a gearbox and an electric generator situated on a tower and driven by the force of wind on blades of a rotor. Because the gearbox and electrical generator are located on top of the tower, the failure of the gearbox or electrical generator can require a substantial period of time to repair resulting in a considerable loss of productivity.

III. SUMMARY OF THE INVENTION

Accordingly, a broad object of particular embodiments of the invention can be to provide a wind turbine having a swivel assembly located on top of a support tower which allows rotation of a drive line through a pair of right angle drives to turn an electric generator proximate ground level.

Another broad object of particular embodiments of the invention can be to provide a method of manufacturing a wind turbine having a swivel assembly located on top of a support tower which allows rotation of a drive line through a pair of right angle drives to turn an electric generator proximate ground level.

Another broad object of particular embodiments of the invention can be to provide a method of generating electricity by providing a wind turbine having a swivel assembly located on top of a support tower which allows rotation of a drive line through a pair of right angle drives to turn an electric generator proximate ground level.

Naturally, further objects of the invention are disclosed throughout other areas of the specification, drawings, photographs, and claims.

IV. BRIEF DESCRIPTION OF THE DRAWINGS

FIG. 4 is a front perspective view of the swivel assembly of the embodiment of the inventive wind turbine shown in FIG. 1.

FIG. 5 is a back perspective view of the swivel assembly of the embodiment of the inventive wind turbine shown in FIG. 1.

FIG. 6 is a first side view of the swivel assembly.

FIG. 15 is an exploded view of a swivel assembly of the particular embodiment of the inventive wind driven electric generator shown in FIG. 14.

FIG. 19 is top plan view of the swivel assembly depicted in FIG. 15.

FIG. 20 is bottom plan view of the swivel assembly depicted in FIG. 15.

FIG. 22A is front elevation view of an embodiment of a rotor shaft hub coupled to a rotor shaft rotationally journaled in a rotor shaft sleeve.

FIG. 22B is a cross sectional view of the rotor shaft hub coupled to the rotor shaft rotationally journaled in the rotor shaft sleeve depicted in FIG. 22A.

FIG. 24 is an enlarged front elevation view of the transmission system coupled to an electric generator shown in FIG. 14.

V. DETAILED DESCRIPTION OF THE INVENTION

Figure 1:
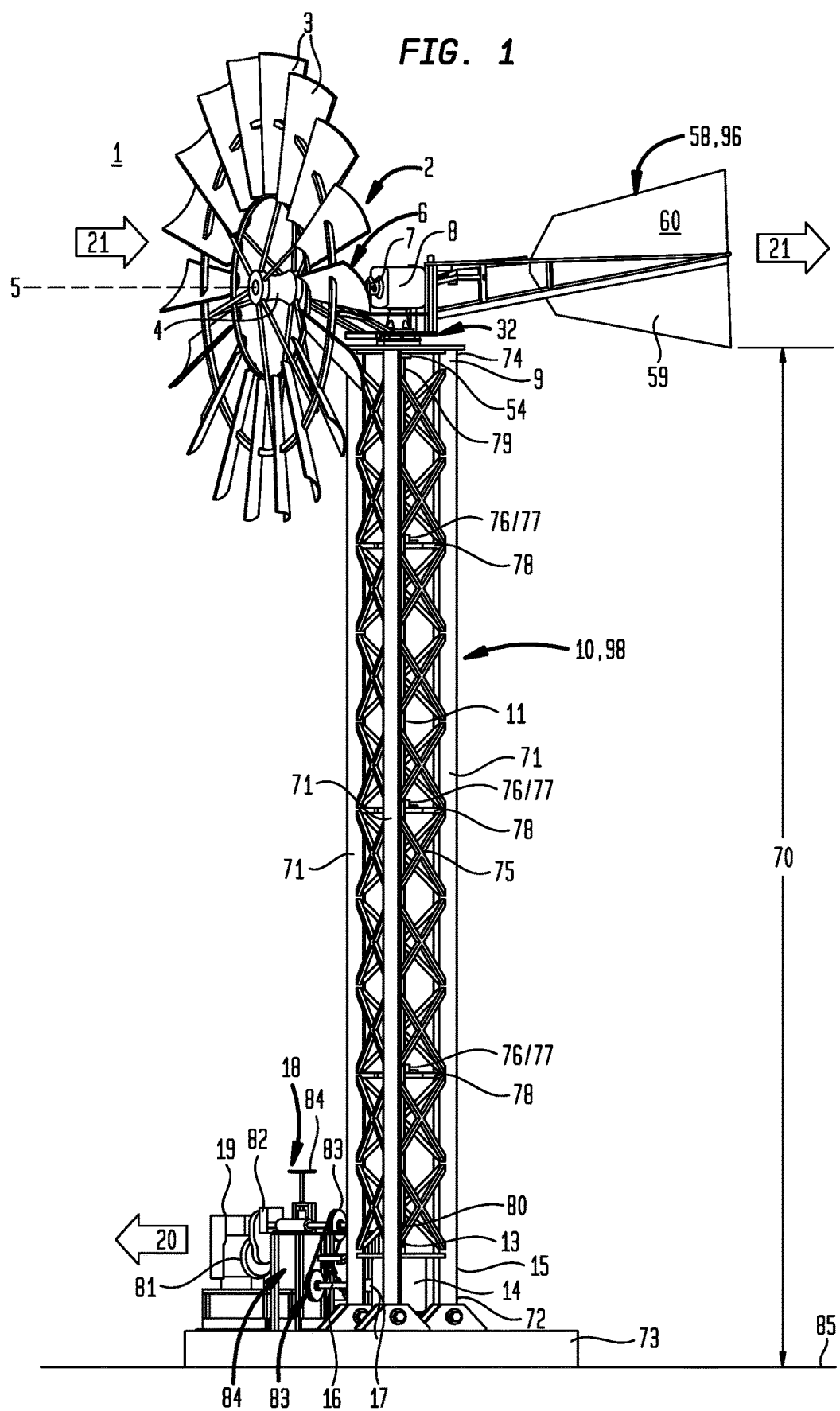
FIG. 1 is a first perspective elevation view of an embodiment of the inventive wind driven electric generator.
Figure 2:
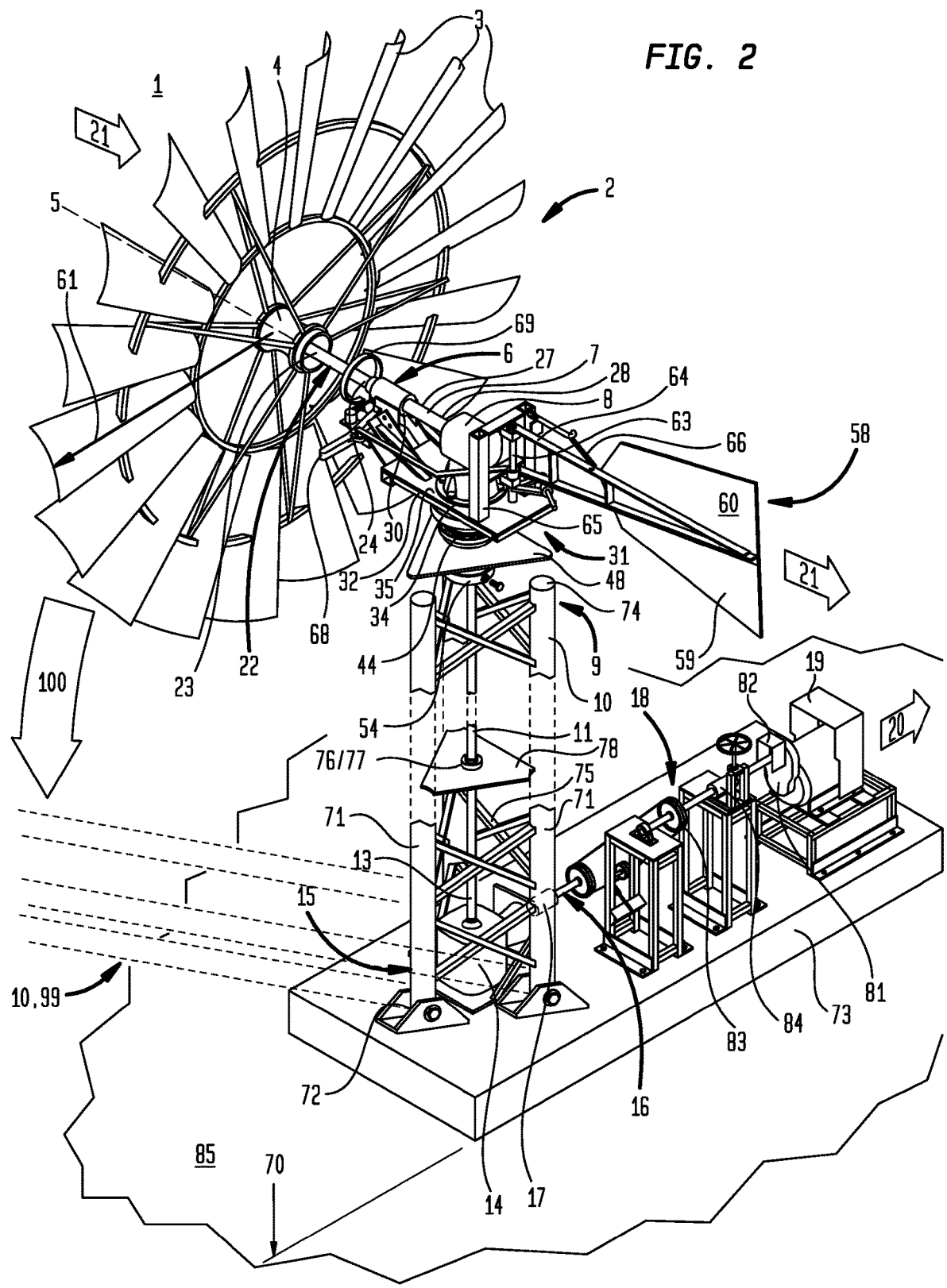
FIG. 2 is a second perspective elevation view of the embodiment of the inventive wind turbine shown in FIG. 1.

Now referring primarily to FIGS. 1 and 2, which provide a general overview of particular embodiments of an inventive wind driven electric generator (1) which can include a rotor (2) having one more rotor vanes (3) connected to a rotor hub (4) which rotates about a rotor axis (5). The hub (4) of the rotor (2) can be connected directly or indirectly to a first drive line (6) rotatably driven by rotation of the rotor (2) about the rotor axis (5). The first drive line (6) can be coupled to an input shaft (7) of a first right angle drive (8) swivelly coupled on a top end (9) of a support tower (10). A second drive line (11) can be connected between an output shaft (12) of the first right angle drive (8) swivelly coupled on the top end (9) of the support tower (10) and an input shaft (13) of a second right angle drive (14) located proximate a bottom end (15) of the support tower (10). A third drive line (16) can be connected between an output shaft (17) of the second right angle drive (14) and a power transmission assembly (18). The power transmission assembly (18) can be coupled to an electric generator (19). The electric generator (19) converts mechanical energy from rotation of the rotor (2) into electrical energy (20).

Figure 3:
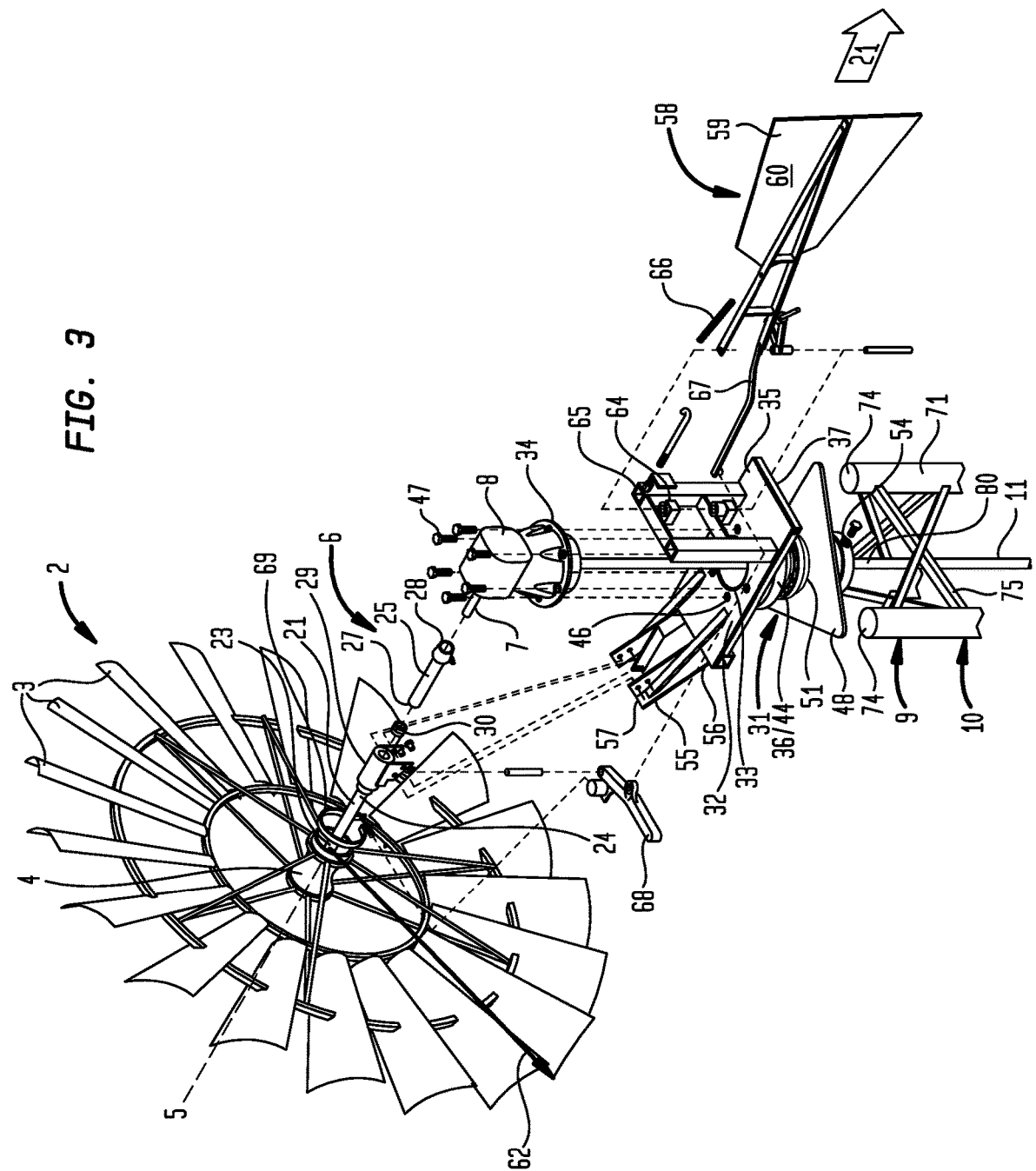
FIG. 3 is an exploded view of an upper portion of the embodiment of the inventive wind turbine shown in FIG. 1.
Figure 7:
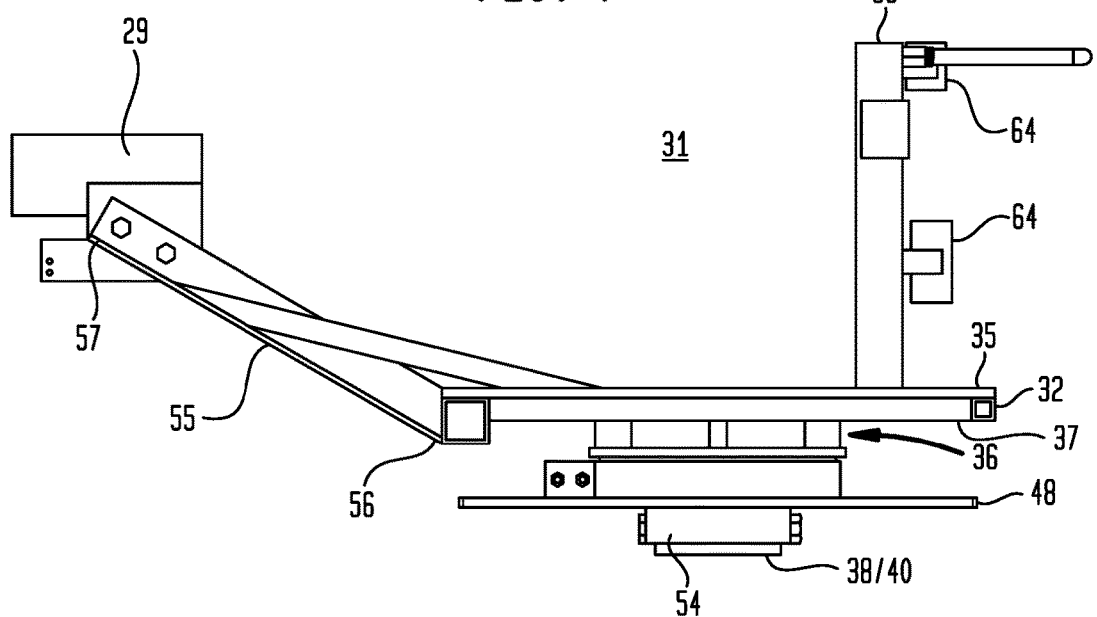
FIG. 7 is a second side view of the swivel assembly.
Figure 8:
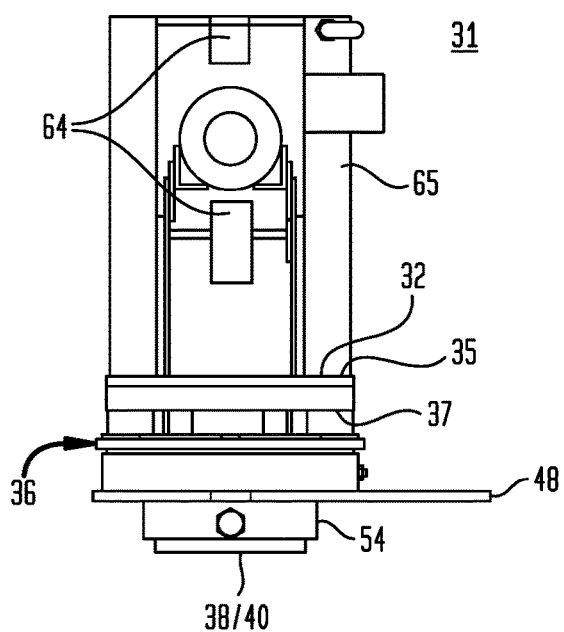
FIG. 8 is a first end view of the swivel assembly.
Figure 9:
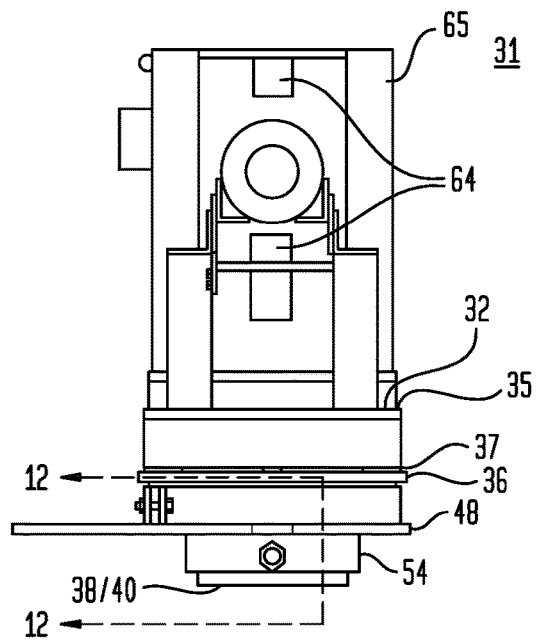
FIG. 9 is a second end view of the swivel assembly.
Figure 10:
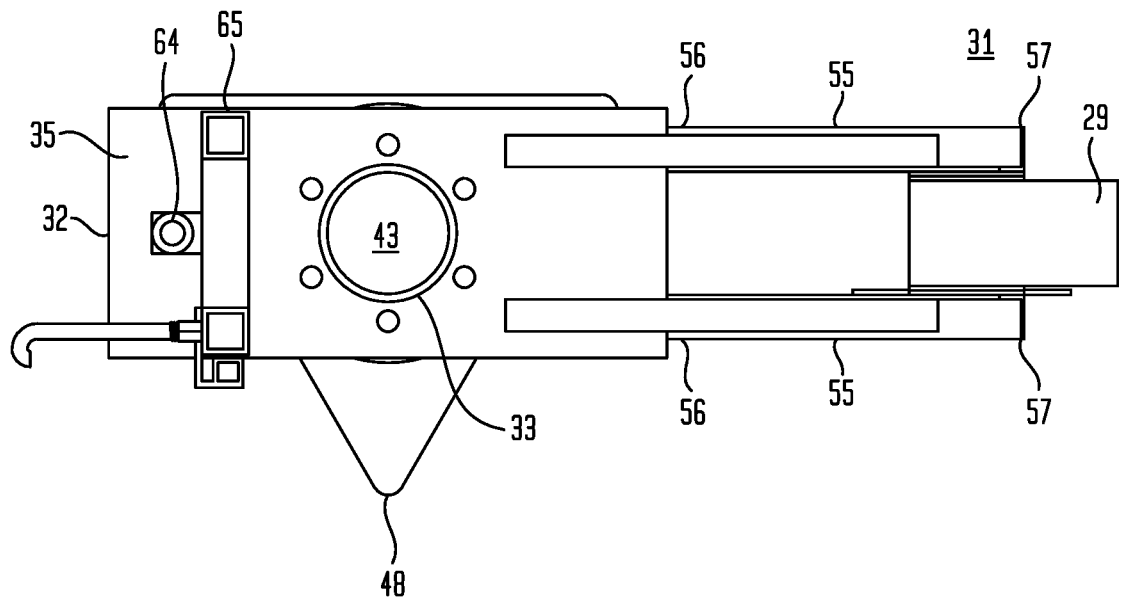
FIG. 10 is a top view of the swivel assembly.
Figure 11:
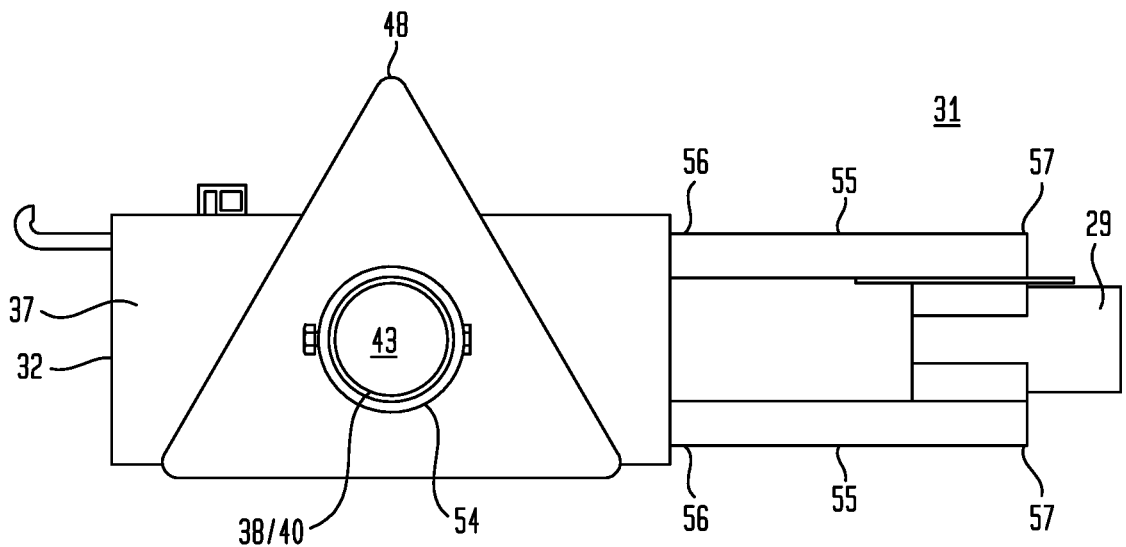
FIG. 11 is a bottom view of the swivel assembly.

Now referring primarily to FIGS. 1 through 3, the rotor (2) can take the form of one or a plurality of vanes (3) connected directly or indirectly in radially spaced apart relation about the perimeter of the rotor hub (4). The one or more vanes (3) each radially extend a distance from the rotor hub (4) to intercept air movement (21) past the vanes (3). The vanes (3) can, but need not necessarily, be designed like wings to maximize extracted kinetic energy up to the limit of Betz law. Depending upon the design, beyond three vanes (3), it is thought that only a few extra percents of energy may be captured by any design of the one or more vanes (3); however, this theory is not meant to limit the invention to any particular number of vanes (4). The kinetic energy of the air movement (21) captured by the vanes (3) can be converted into mechanical energy to rotate the rotor hub (4) about the rotor axis (5). The illustrative example of FIGS. 1 through 3 show a rotor (2) in the constructional form of a wheel assembly similar to those available from Aermotor Windmill Company, Inc.; however, embodiments of the invention can utilize a wide variety of vane (3) designs.

Again, referring primarily to FIGS. 1 through 3, the rotor hub (4) of the rotor (2) can be connected directly or indirectly to the first drive line (6). The first drive line (6) can be rotatably driven by rotation of the rotor (2) about the rotor axis (5). The first drive line (6) can, as to certain embodiments, include a rotor hub shaft (22) having a rotor hub shaft first and second ends (23)(24). The rotor hub shaft first end (23) can be fixedly connected to the rotor hub (4) such that rotation of the rotor hub (4) correspondingly generates rotation of the rotor hub shaft (22) about the rotor axis (5). A rotor hub shaft adaptor (25) can include an internal adaptor passage (26) which communicates with the adaptor first end (27). The adaptor passage (26) receives the rotor hub shaft second end (24) and can dispose the rotor hub shaft (22) in fixed relation with the rotor hub shaft adaptor (25) such that rotation of the rotor hub shaft (22) causes rotation of the rotor hub shaft adaptor (25). The rotor hub shaft adaptor (25) can have an adaptor second end (28) configured to mate in fixed relation with the input shaft (7) of the first right angle drive (8) such that rotation of the rotor hub shaft adaptor (25) causes rotation of the input shaft (7) of the first right angle drive (8). The rotor hub shaft (22) or the rotor hub shaft adaptor (25) can be rotationally journaled in a shaft adaptor sleeve (29) which supports the combination of the rotor (2) and first drive line (6). The shaft adaptor sleeve (29) can, but need not necessarily, include adaptor sleeve bearing elements (30) which can be a solid, roller element, or other type of bearing element (30).

Now referring primarily to FIGS. 3 through 13, embodiments of the inventive wind driven electric generator (1) can include a swivel assembly (31) coupled to the top end (9) of the support tower (10). The first right angle drive (8) can be mounted to the swivel assembly (31) to swivelly couple the first right angle drive (8) to the top end (9) of the support tower (10). A wide variety of right angle drives (8) may be suitable for use in embodiments of the invention.

The swivel assembly (31) includes a swivel plate (32) having a centrally located swivel plate aperture element (33). The first right angle drive (8) can have a first right angle drive mounting flange (34) which abuttingly fastens to the swivel plate top surface (35) with the output shaft (12) of the first right angle drive (8) passing through the swivel plate aperture element (33). A swivel sleeve (36) can be mounted to a swivel plate bottom surface (37). The swivel sleeve (36) can include a tubular sleeve (38) having a tubular sleeve first end (39) and a tubular sleeve second end (40). The tubular sleeve (38) defines a sleeve external surface (41) of substantially cylindrical form and a sleeve internal surface (42) that defines a swivel sleeve passage (43) open at the tubular sleeve first end (39) and at the tubular sleeve second end (40) through which the output shaft (12) of the first right angle drive (8) can pass. An annular member (44) can be concentrically positioned about the tubular sleeve first end (39) to define an annular space (45) between the tubular sleeve first end (39) and the annular member (44). As to particular embodiments, each of the first right angle drive mounting flange (34), the swivel plate (32), and the tubular sleeve first end (39) integrally connected to annular member (44) can include a plurality of mounting holes (46) which can be aligned to receive a corresponding plurality of mechanical fasteners (47) to position in fixed unmoving relation the first right angle drive (8), the swivel plate (32), and the swivel sleeve (36).

An upper platform (48) can be coupled to the top end (9) of the support tower (10). The upper platform (48) can include a centrally located substantially circular aperture element (49) defining a substantially circular opening (50). A bearing (52) can be disposed inside of an annular space (45). A bearing external surface (53) can engage the annular member (44) and a bearing internal surface (53) can define a bearing open area (54) within the circular opening (50) of the circular aperture element (49) of the upper platform (48). The diameter of the bearing internal surface (53) can be selected to engage the sleeve external surface (41).

Figure 12:
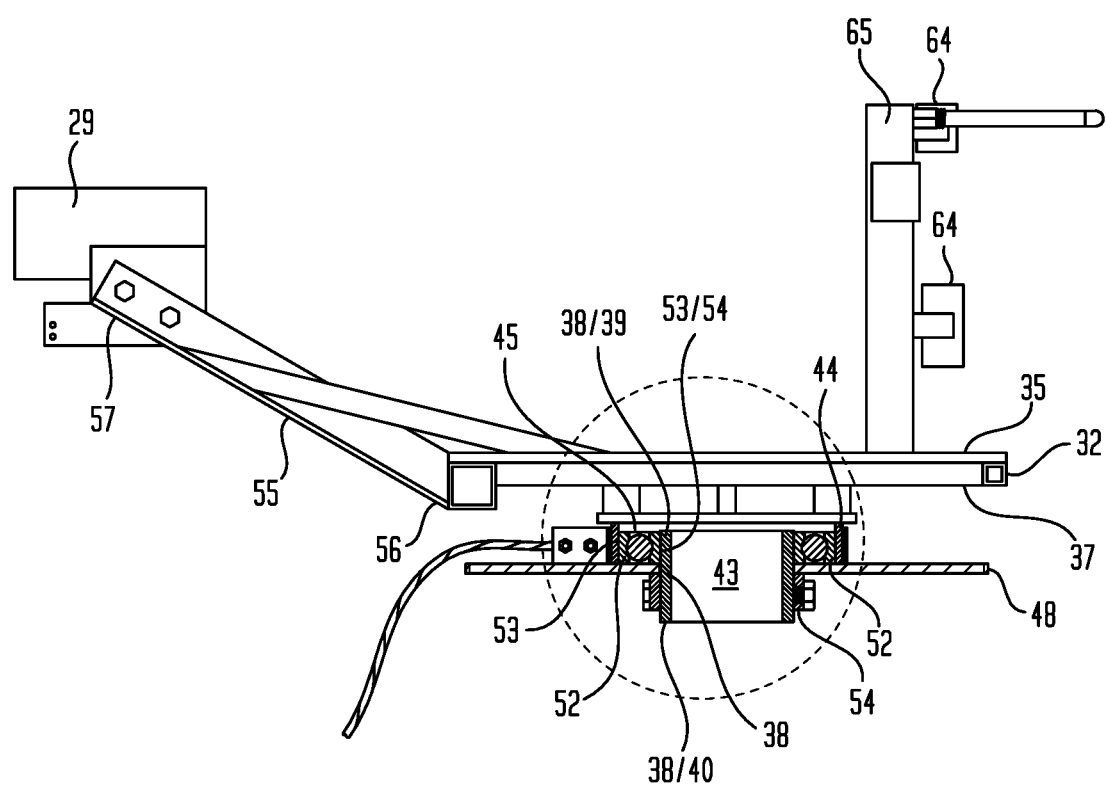
FIG. 12 is a partial cross section view 12-12 as shown in FIG. 9.
Figure 13:
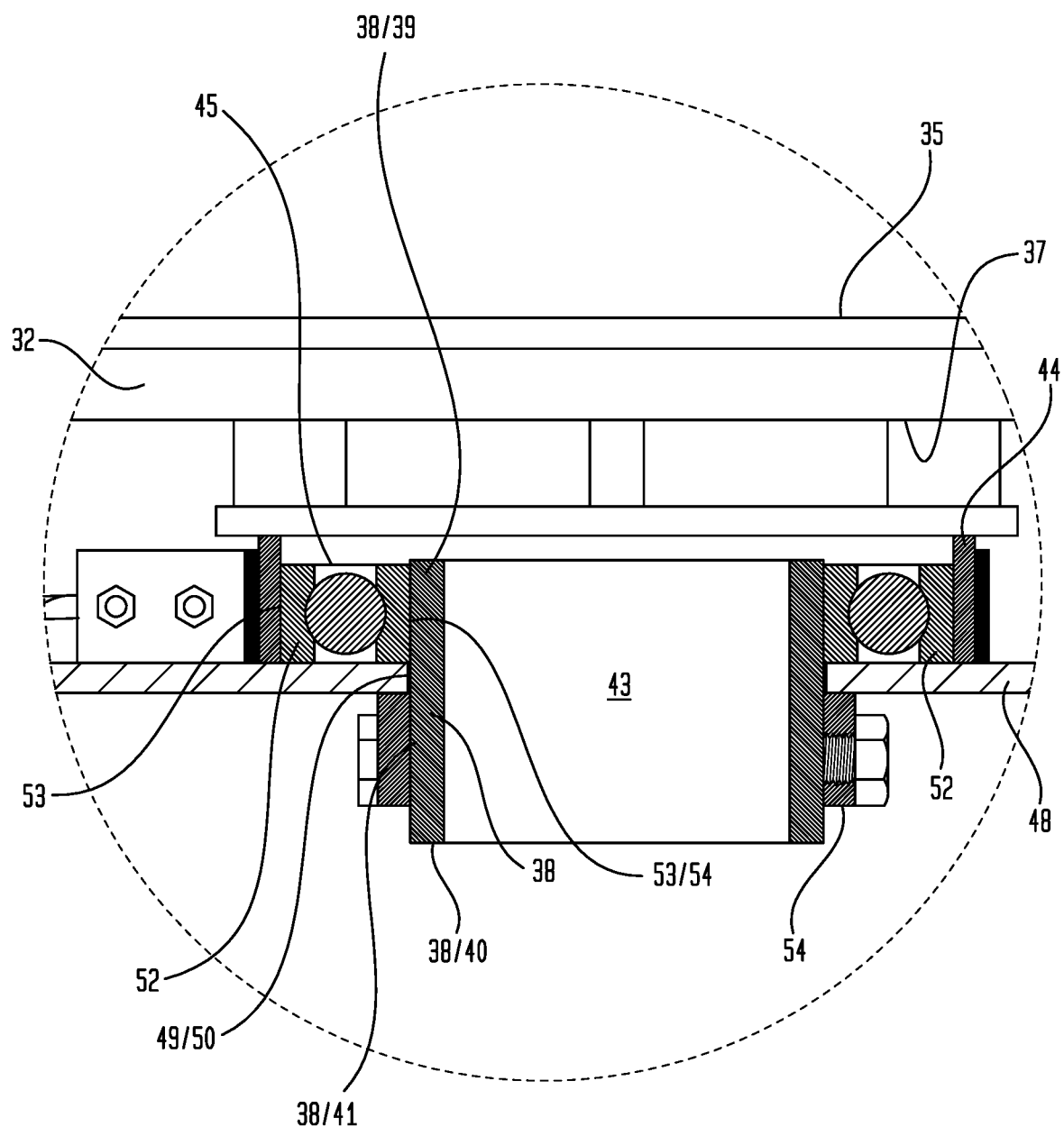
FIG. 13 is an enlarged portion of the cross sectional view shown in FIG. 12.

Now referring primarily to FIGS. 3, 12 and 13, the swivel assembly (31) can be positioned above the upper platform (48) by passing the tubular sleeve (38) through the circular bearing (52) to locate the circular tubular member (51) and the circular bearing (52) inside of the annular space (45) between the sleeve external surface (41) and the annular member (44). The tubular sleeve (38) can extend a sufficient distance below the upper platform (48) to allow a locking collar (54) to be disposed in fixed relation about the sleeve external surface (41) of the tubular sleeve (38) to limit axial movement of the tubular sleeve (38) within the circular bearing (52) while allowing rotational movement of the tubular sleeve (38) within the circular aperture element (49). The circular bearing (52) can be of any type which allows the swivel assembly (31) to rotate above the upper platform (48) through a part of or entirely through 360 degrees, depending upon the design.

Now, referring primarily to FIGS. 4 through 11, the swivel assembly (31) can include one or more support arms (55) connected to the swivel plate (32) by support arm first end(s) (56) and extending outwardly from the swivel plate (32) to allow one or more support arm second end(s) (57) to be connected to the shaft adaptor sleeve (29).

Now, referring primarily to FIGS. 14 through 21, which depict a second embodiment of the swivel assembly (31) coupled to the top end (9) of the support tower (10). The first right angle drive (8) can be mounted to the swivel assembly (31) to swivelly couple the first right angle drive (8) to the top end (9) of the support tower (10).

Figure 14:
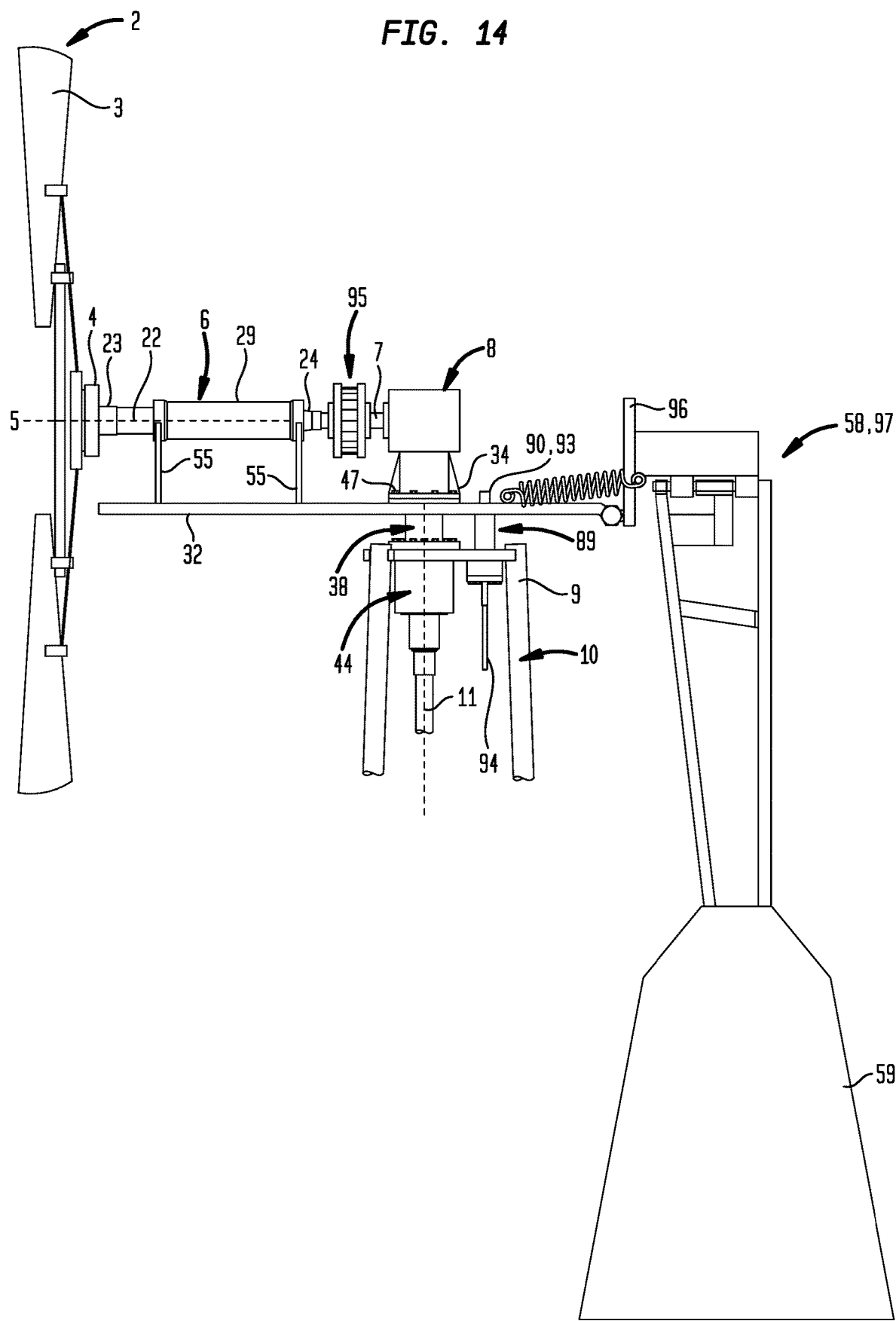
FIG. 14 is a side elevation view of a top portion of a particular embodiment of the inventive wind driven electric generator.
Figure 17:
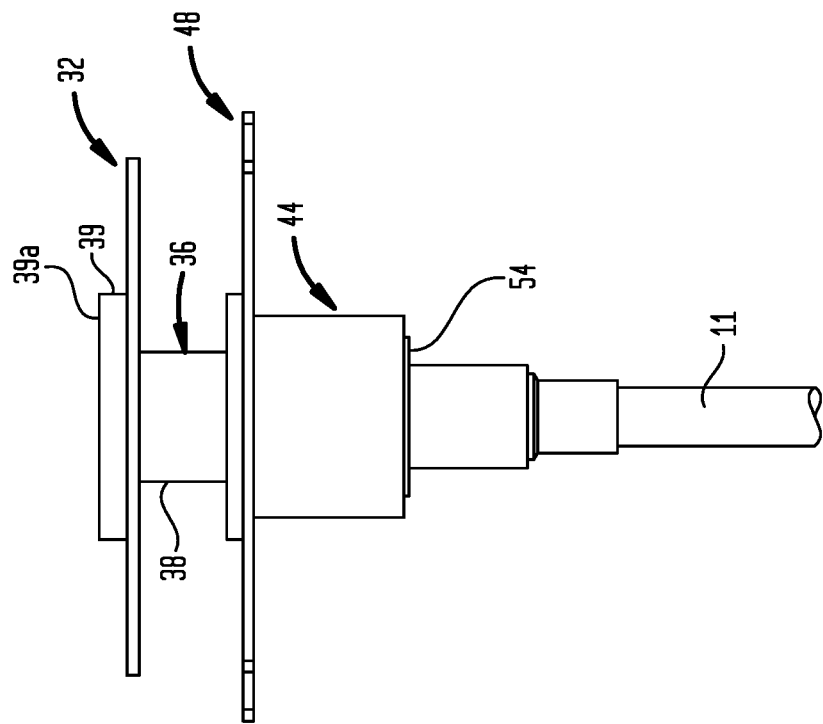
FIG. 17 is a second end elevation view of the swivel assembly depicted in FIG. 15.
Figure 16:
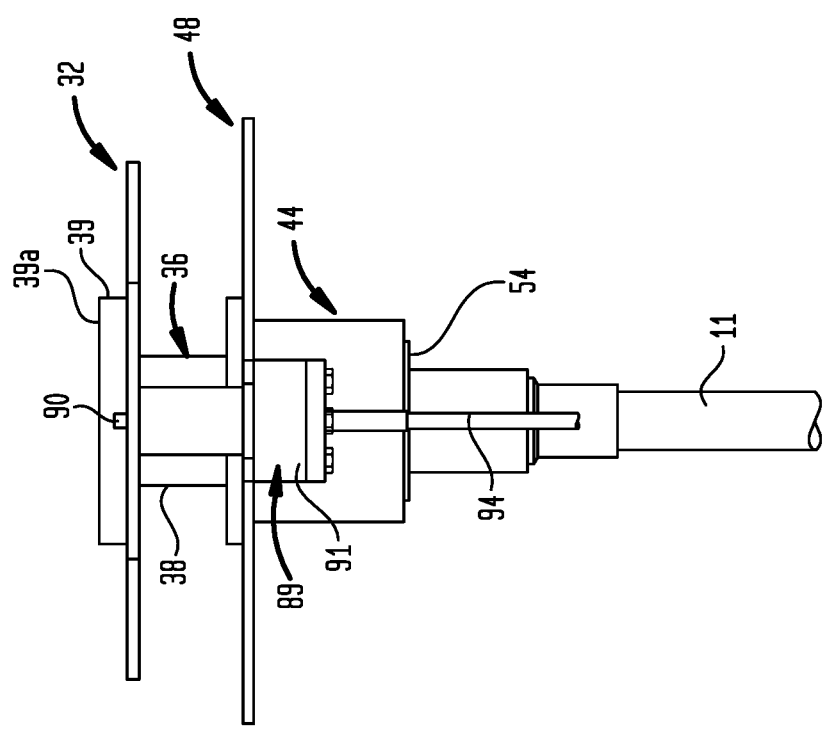
FIG. 16 is a first end elevation view of the swivel assembly depicted in FIG. 15.
Figure 18:
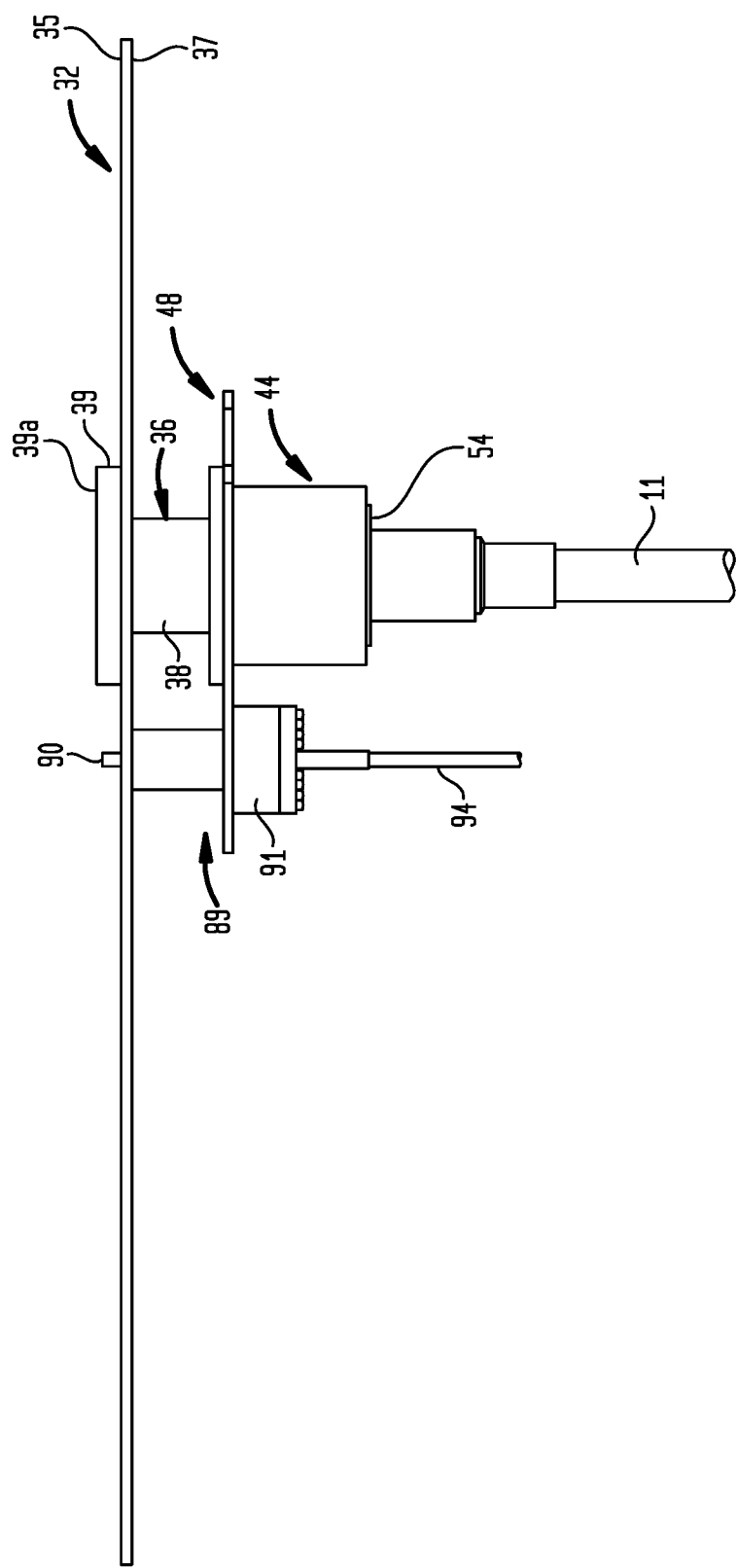
FIG. 18 is a side elevation view of the swivel assembly depicted in FIG. 15.

The swivel assembly (31) can include a swivel plate (32) having a centrally located swivel plate aperture element (33). The swivel sleeve (36) can be mounted to a swivel plate (32). The swivel sleeve (36) can include a tubular sleeve (38) having a tubular sleeve first end (39) and a tubular sleeve second end (40). In particular embodiments the tubular sleeve first end (39) can include a radially extending annular flange (39a) which can be fastened to the swivel plate top surface (35) as shown in the example of FIGS. 15 and 17), or in particular embodiments, can be fastened to the swivel plate bottom surface (37). The annular flange (39a) can include a plurality of apertures (39b) disposed in circumferentially spaced apart relation which align with a plurality of apertures (32a) disposed in the swivel plate (32) in circumferentially spaced apart relation about the swivel plate aperture element (33) to allow the annular flange (39a) and the swivel plate (32) to be joined by mechanical fasteners (47) (as shown in the example of FIG. 14). The tubular sleeve (38) defines a tubular sleeve external surface (41) of substantially cylindrical form and a tubular sleeve internal surface (42) that defines a swivel sleeve passage (43) open at the tubular sleeve first end (39) and at the tubular sleeve second end (40) through which the output shaft (12) of the first right angle drive (8) can pass.

Figure 21:
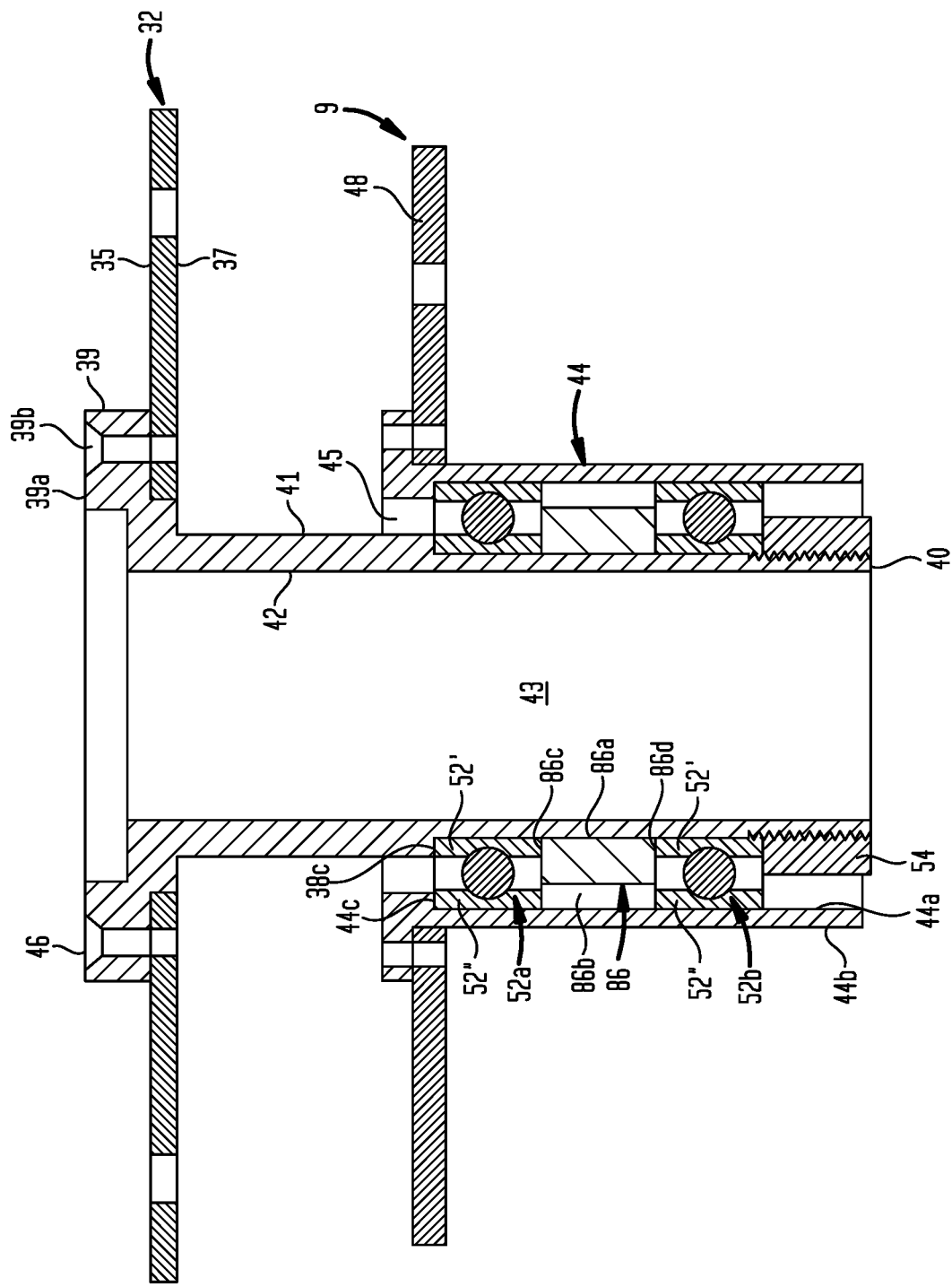
FIG. 21 is a cross sectional view 21-21 of the swivel assembly depicted in FIG. 19.

Now, referring primarily to FIGS. 15 and 21, an annular member (44) can be concentrically positioned about the tubular sleeve (38) to define an annular space (45) between the tubular sleeve (38) and the annular member (44). One bearing (52) or a pair of bearings (52a) (52b) can be disposed inside of the annular space (45) between the tubular sleeve external surface (41) and the annular member internal surface (42). Each of the bearings (52) or (52a) (52b) can include a bearing inner race (52') rotatable within a bearing outer race (52"). The bearing inner race (52') can have an bearing inner race internal surface (52') dimensioned to engage the tubular sleeve external surface (41) and the bearing outer race (52") can have a bearing outer race external surface (53") dimensioned to engage the annular member internal surface (44a) whereby the tubular sleeve (38) can rotate within the annular member (44).

Again, with primary reference to 15 and 21, the annular member internal surface (44a) can further include an annular member shoulder (44c) radially inwardly extending from the annular member internal surface (44a). The tubular sleeve (38) can further include a tubular sleeve shoulder (38a) extending radially outward of the tubular sleeve external surface (41). The annular member shoulder (44c) and the tubular sleeve shoulder (38a) can be axially aligned in opposed relation a distance apart. The first bearing (52a) can have a bearing outer race (52") engaged to the annular member shoulder (44c) and the bearing inner race (52') can be engaged to the tubular sleeve shoulder (44c). An annular spacer (86) can be disposed in the annular space (45) have an annular spacer internal surface (86a) engaging the tubular sleeve external surface (41) and radially outwardly extending to an annular spacer outer surface (86b) joining opposite annular spacer first and second sides (86c) (86d). The annular spacer first side (86c) can be forcibly urged against the inner race (52') of the first of the pair of bearings (52a) without engaging the outer race (52") of the first of the pair of bearings (52a), thereby disposing in fixed axial and radial spatial relation the tubular sleeve (38) within the tubular member (44) and whereby the tubular sleeve (38) can rotate within the tubular member (44).

Again, with primary reference to FIGS. 15 and 21, in particular embodiments, a second of the pair of bearings (52b) can be disposed in the annular space (86) between the tubular sleeve external surface (41) and the annular member internal surface (44a). The second of the pair of bearings (52b) can include a bearing inner race (52') rotatable within a bearing outer race (52"). The bearing inner race (52') can have an bearing inner race internal surface (53') dimensioned to engage the tubular sleeve external surface (41) and the bearing outer race (52") can have a bearing outer race external surface (53") dimensioned to engage the annular member internal surface (44a), whereby the tubular sleeve (38) can rotate within the annular member (44). The bearing inner race (52') be disposed within the annular space (45) to engage the annular spacer (86) without the annular spacer (86) engaging the outer race (52") of the second of the pair of bearings (52a), thereby disposing in fixed axial and radial spatial relation the tubular sleeve (38) within the tubular member (44) and whereby the tubular sleeve (38) can rotate within the tubular member (44).

Again, with primary reference to FIGS. 15 and 21, a collar (54) can be disposed on the tubular sleeve second end (40) and forcibly urged in fixed spatial relation against the bearing inner race (53') of the second of the pair bearings (52b), thereby disposing in fixed axial and radial spatial relation the tubular sleeve (38) and the tubular member (44) and whereby the tubular sleeve (38) can rotate within the tubular member (44). In particular embodiments, the collar (54) can have a threaded internal surface (87) and the tubular sleeve (38) can have a threaded external surface (88) proximate the tubular sleeve second end (40). The collar (54) can be rotationally mateably engaged with the tubular sleeve (38) to urge the inner races (52') of the first and second bearings (52a) (52b) and the annular spacer (86) in fixed axial relation with the tubular sleeve shoulder (44c) to substantially alleviate any axial movement of the tubular sleeve with in the annular member and alleviate radial movement of the tubular sleeve (38) within the annular member (44) while allowing free rotation of the tubular sleeve (38) within the annular member (44).

Again, with primary reference to FIG. 14, the first right angle drive (8) can have a first right angle drive mounting flange (34) which couples in immovable fixed relation to the swivel plate top surface (35), or the annular flange (39a)) of tubular sleeve (38), with the output shaft (12) of the first right angle drive (8) passing through the tubular sleeve (38), thereby allowing the first right angle drive (8) to correspondingly rotate with the swivel plate (32) with the output shaft (12) connected to the second right angle drive (14).

Now, with primary reference to FIGS. 14 through 20, particular embodiments, can further include a swivel plate rotation arrest (89) operable to arrest rotation of the swivel plate (32). In particular embodiments, an arrest pin (90) can be axially slidably engaged in an arrest housing (91). The arrest housing (91) can be mounted to upper platform (48) with the arrest pin (90) slidably moveable within the arrest housing (91) toward the swivel plate (32). The swivel plate (32) can include a plurality of arrest apertures (92) disposed in circumferentially spaced apart relation about the swivel plate aperture element (33). The arrest pin (90) can be moved into one of the plurality of arrest apertures (92) to substantially bar or bar rotation of the swivel plate (32). In particular embodiments, the arrest pin (90) can be springingly engaged in the arrest housing (91) to urge the arrest pin (90) toward the swivel plate (32) to dispose the arrest pin (90) in an arrest condition (93) of the swivel plate (32). The arrest pin (91) can be disengaged from the engaged one of the plurality of swivel plate apertures (92) by pulling force applied to a pin actuator lead (94) which draws the arrest pin (90) into the arrest housing (91). The arrest pin (90) drawn into the arrest housing (91) can be held by a pin detent to prevent movement of the arrest pin (90) toward the swivel plate (32). The arrest pin (90) can be moved toward the swivel plate (32) by pushing force applied to the pin actuator lead (94) to overcome resistance of the pin detent.

Figure 23:
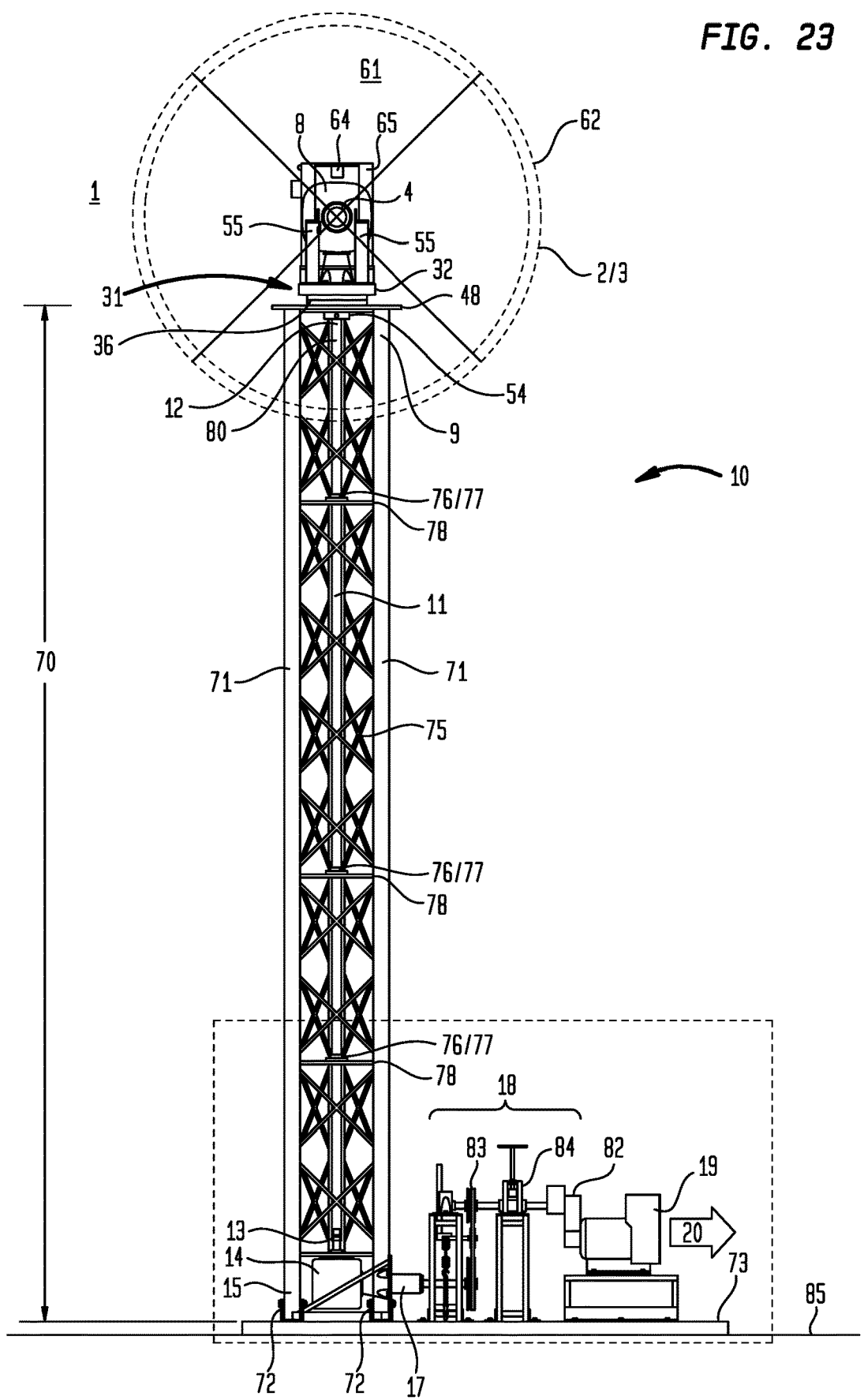
FIG. 23 is an elevation view of the wind driven electric generator and front elevation view of a transmission system coupled to an electric generator.

Now, with primary reference to FIG. 23, in particular embodiments, the rotor (2) can be coupled by a rotor hub (4) to a rotor hub shaft first end (23) of a rotor shaft (22) rotatingly journaled in a shaft sleeve (29). In particular embodiments, the rotor hub shaft (22) can be journaled in the shaft sleeve (29) by a pair of sleeve bearing elements (3). In particular embodiments the rotor hub shaft second end (24) can be coupled to the input shaft (13) of the first right angle drive (8), or a flex coupler (95) can be disposed between the rotor hub shaft second end (24) and the input shaft (13) of the first right angle drive (8). The flex coupler (95) can compensate for minor amounts of misalignment between the rotor hub shaft (22) and the input shaft (7) of the first right angle drive (8); and, in certain cases, to provide vibration dampening or to disconnect the rotor hub shaft (22) from the input shaft (7) of the first right angle drive (8) in the case of torque overload.

Again, referring primarily to FIGS. 1 through 3, the swivel assembly (31) can further include a tail assembly (58) including a tail vane (59) extending outward from the swivel plate (32). The tail vane (59) can be configured to align with air (21) moving past the tail vane (59) to correspondingly rotate the swivel assembly (31) to maintain the rotor (2) facing into the air movement (21) during normal and turbulent wind conditions. If the tail vane (59) is properly sized, the rotor (2) will face the core air movement (21) direction to maximize rounds per minute of the rotor (2) and correspondingly the first drive line (6). The easiest way to establish the tail vane area (60) is to relate it to the sweep area (61) of the rotor (2) (as shown in the example of FIGS. 3 and 14). The sweep area (61) of a rotor (2) is the square of the rotor radius (R) (62) times pi (3.1415). Sweep Area=$R^2 \times 3.1415$. The tail vane area (60) should be no less than five percent of the sweep area (61) of the rotor (2). The larger the tail vane area (60), the more influence it will have on maintaining proper orientation of the rotor (2) to the direction of the air (21) movement. The tail vane (59) can pivot about a pivot (63) disposed in a pivot mount (64) supported by a pivot frame (65) extending upwardly from the swivel plate (32). As to particular embodiments, a springing element (66) attached between the pivot frame (64) and the tail vane (59) springingly resists rotation of the tail vane (59) about the pivot (63).

Again, referring primarily to FIGS. 2 and 3, slowing or halting the rotor (2) involves converting its kinetic energy into heat. As to particular embodiments of the tail assembly (58), the tail vane (59) can pivot about the pivot (63) to actuate a brake linkage (67) connecting the tail vane (59) and a brake lever (68) which operates to control constriction and expansion of a band brake (69) disposed circumferentially about the external surface of the rotor hub (2). A band brake (69) suitable for use with embodiments of the invention can be obtained from Aermotor Windmill Company, Inc., Part No. 690 windmill band brake. The brake linkage (67) can be responsive to pivoting of the tail vane (59) toward parallel with the rotor (2) to correspondingly operate the brake lever (68) to constrict the brake band (69) and slow or halt rotation of the rotor (2). As to particular embodiments, a springing element (66) can be connected between the pivot frame (65) and the tail vane (59) to urge the tail vane (59) toward orthogonal relation with the rotor (2) and correspondingly operate the brake to expand the brake band (69) and allow the rotor (2) to rotate freely.

Now, with primary reference to FIGS. 1 and 14. in particular embodiments, the tail assembly (58) can further include a rotatable base plate (96) allowing the tail assembly (58) to be rotated from a primarily orthogonal orientation (96) to the supporting tower (10) (as shown in the example of FIG. 1) to a primarily parallel orientation (97) (as shown in FIG. 14).

Now referring primarily to FIGS. 1, 2, and 14, embodiments of the invention can further include a support tower (10) which elevates the rotor (2), so the rotor vanes (3) safely clear the ground, and reach cleaner or stronger winds at higher elevations. At higher elevations, the air movement (21) can be greater and less turbulent. Power output from embodiments of the invention can be the cube of the wind speed, so even small increases in air movement (21) captured by the rotor (2) on a taller support tower (10) can have significant impact on energy production. While the support tower (10) can be just tall enough to allow the rotor vanes (3) to clear ground level (85), typically, the support tower height (70) will be about twenty feet or greater than twenty feet. Particular embodiments of the support tower (10) can comprise a free standing lattice support tower (10) typically including three or more tower supports (71) (as shown in the example of FIG. 1); however, this illustrative example is not intended to limit the invention solely to free standing lattice support towers (10) and embodiments can include guyed support towers, free standing tubular towers, floating towers, or the like.

Now, with primary reference to FIGS. 2 and 14, in particular embodiments, the support tower (10) can be rotatably mounted to the load bearing foundation (79) (as depicted by arrow (96) in FIG. 2) to move the support tower (10) from a primarily vertical orientation (98) (as shown in FIG. 1) to a primarily horizontal orientation (99) (as shown by the arrow (100) depicted in FIG. 1). Accordingly, in particular embodiments in which the load bearing foundation (79) comprises a trailer designed to be towed by a motorized vehicle, the support tower (10) can be rotated to a primarily horizontal orientation (99) to dispose the rotor (2) facing the trailer bed and the tail assembly (58) rotated to from a primarily orthogonal orientation (96) to the support tower (10) to a primarily parallel orientation (97) to the support tower (10) (as shown in the example of FIG. 14).

As one illustrative example, a free standing lattice support tower (10) (as shown in the example of FIG. 1) can include three tubular tower supports (71) each having a length of about 20 feet (for example each support can be schedule 40 black pipe 21 feet in length). The tower supports (10) can be vertically disposed in the corners of an equilateral triangle (as shown in the example of FIG. 2). The tubular support first ends (72) can be directly or indirectly coupled to load bearing foundation (73), such as concrete foundation. The tubular support second ends (74) can be directly or indirectly connected to the upper platform (48). The tower supports (71) can be interconnected by a structural cross lattice (75) (for example one quarter inch thick steel angle having equal legs of one inch having the ends cut at 45 degrees). A plurality of second drive line sleeves (76) can be centrally located in spaced apart relation within the support tower (10). As shown in the examples of FIGS. 1 and 2, the second drive line sleeves (76) can be spaced apart in increments of about 5 feet to about 10 feet. As an illustrative example, the second drive line sleeves (76) can comprise a pillow block (77) having about a two-inch internal diameter such as NorTrac pillow block, Part No. 189780. As to particular embodiments, the second drive line sleeves (76) can each be supported by a drive line sleeve plate (78) configured to interconnect the plurality of tower supports (71) and to orient the corresponding drive line sleeve (76) in alignment with the second drive line (11).

Again, referring primarily to FIGS. 1, 2, and 14, the second drive line (11) can have a second drive line first end (78) connected to the output shaft (12) of the first right angle drive (8). The second drive line (11) can pass through the plurality of second drive line sleeves (76), and the second drive line second end (80) can be connected to the input shaft (13) of the second right angle drive (14). As an illustrative example, the second drive line (11) can be a pipe having an internal diameter of about 1¼ inches and an external diameter of about 1⅜ inches. The second right angle drive (14) can be mounted in fixed immovable relation to the load bearing foundation (73) at a location that aligns the input shaft (13) of the second right hand drive (14) with the second drive line (11) passing through the plurality of second drive line sleeves (76).

Again, referring primarily to FIGS. 1 and 2, embodiments of the invention can further include an electric generator (19) mounted to the load bearing foundation (73). A third drive line (16) can be connected between the output shaft (17) of the second right angle drive (14) and the input shaft (81) of the electric generator (19). The third drive line (16) can include a transmission assembly (18) which can, but need not necessarily, include a gear box (82) which adjusts the rotations per minute of the output shaft (17) of the second right angle drive (14) to the operational rotations per minute of the electric generator (19). A clutch assembly (83) and a brake assembly (84) can be interposed between the output shaft (17) of the second right angle drive (14) and the gearbox (82) to respectively uncouple the output shaft (17) of the second right angle drive (14) from the gearbox (82) or to slow or halt rotation of the input shaft (81) to the electric generator (19).

As can be easily understood from the foregoing, the basic concepts of the present invention may be embodied in a variety of ways. The invention involves numerous and varied embodiments of a wind driven electric generator and methods for making and using such wind driven electric generator including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "generator" should be understood to encompass disclosure of the act of "generating"— whether explicitly discussed or not—and, conversely, were there effectively disclosure of the act of "generating", such a disclosure should be understood to encompass disclosure of a "generator" and even a "means for generating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the wind driven electric generators herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A wind turbine, comprising:
a swivel assembly including:
a swivel plate having a swivel plate top surface opposite a swivel plate bottom surface;
a tubular sleeve joined to said swivel plate and extending through said swivel plate, said tubular sleeve having a tubular sleeve external surface and a swivel sleeve internal surface defining a tubular sleeve passage extending axially through said swivel plate;
an annular member joined to and extending through an upper platform of a support tower, said annular member having an annular member internal surface concentrically disposed about said tubular sleeve external surface defining an annular space between said annular member internal surface and said tubular sleeve external surface,
said annular member including an annular member shoulder extending radially inward from said annular member internal surface,
said tubular sleeve including a tubular sleeve shoulder disposed medially between a tubular sleeve first end and a tubular sleeve second end and extending radially outward of the tubular sleeve external surface,
said annular member shoulder axially aligned in opposed relation a distance from said tubular sleeve shoulder disposes said swivel plate a distance from said upper platform,
a first bearing including a first bearing inner race rotatable within a first bearing outer race, said first bearing inner race engaging said tubular sleeve external surface and said first bearing outer race engaging said annular member internal surface;
an annular spacer having an annular spacer internal surface engaging the tubular sleeve external surface and radially outwardly extending to an annular spacer outer surface joining opposite annular spacer first and second sides, said annular spacer first side in contact with said first bearing inner race of said first bearing;
a second bearing including a second bearing inner race rotatable within a second bearing outer race, said second bearing inner race of said second bearing in contact with said annular spacer second side;
a collar threadingly coupled about said tubular sleeve second end, said collar contacting said second bearing inner race, thereby disposing in fixed axial and radial spatial relation the tubular sleeve and the annular member, whereby the tubular sleeve can rotate within the annular member;
a swivel plate rotation arrest operable to arrest rotation of said swivel plate, said swivel plate rotation arrest includes:
a plurality of arrest apertures disposed in circumferentially spaced apart relation about said tubular sleeve extending through said swivel plate;
an arrest housing coupled to said upper platform of said support tower; and
an arrest pin axially slidably engaged in said arrest housing, said arrest pin movable to dispose said pin in one of said plurality of arrest apertures to arrest rotation of swivel plate in relation to said upper platform, said arrest pin moveable from one of said plurality of arrest apertures to allow said swivel plate to rotate in relation to said upper platform of said support tower.

2. The wind turbine of claim 1, further comprising a first right angle drive having a first right angle drive input shaft orthogonal to a first right angle drive output shaft, said first right angle drive mounted on said swivel plate top surface of said swivel plate, said first right angle drive output shaft extending through said tubular sleeve passage.

3. The wind turbine of claim 2, further comprising:
a rotor shaft sleeve coupled to said swivel plate having rotor shaft sleeve axis aligned with said first right angle drive input shaft;
a rotor shaft disposed between rotor shaft first and second ends, said rotor shaft rotationally journaled in said rotor shaft sleeve; and
a rotor hub coupled to said rotor shaft first end of said rotor shaft, said rotor shaft second end of said rotor shaft coupled to said first angle drive input shaft of said first right angle drive.

4. The wind turbine of claim 3, further comprising a plurality of rotor vanes connected in radial spaced apart relation about said rotor hub.

5. The wind turbine of claim 3, further comprising a coupler which flexes to accommodate misalignment between said rotor shaft second end of said rotor shaft and said first angle drive input shaft of said first right angle drive.

6. The wind turbine of claim 4, further comprising a tail assembly connected to said swivel plate, said tail assembly having a tail vane of said tail assembly disposed in generally orthogonal orientation to said rotor.

7. The wind turbine of claim 6, further comprising:
a tail vane pivot mount coupled to said swivel plate;
a pivot shaft secured in said tail vane pivot mount, said tail vane pivotally coupled to said pivot shaft; and
a spring attached between said tail vane pivot mount and said tail vane to springingly resist rotation of said tail vane about said pivot shaft.

8. The wind turbine of claim 7, further comprising a brake linkage connected between said tail vane and a brake lever, said brake linkage responsive to pivoting of said tail vane toward parallel with said rotor, said brake lever operable to control constriction and expansion of a band brake disposed circumferentially about an external surface of said rotor hub.

9. The wind turbine of claim 6, wherein said tail assembly has a rotatable base connected to said swivel plate, said tail assembly rotatable between a tail assembly operating condition having a tail vane of said tail assembly disposed in substantially orthogonal orientation to said rotor and a tail vane stowed condition having said tail vane of said tail assembly disposed in substantially parallel orientation to said rotor.

10. The wind turbine of claim 6, further comprising a load bearing foundation, wherein said support tower having a height disposed between support tower top and bottom ends, said upper platform coupled to said support tower top end, said support tower bottom end coupled to said load bearing foundation.

11. The wind turbine of claim 10, further comprising a second right angle drive having a second right angle drive input shaft orthogonal to a second right angle drive output shaft, said second right angle drive located on said foundation, said first right angle drive output shaft connected to said second right angle drive input shaft by a drive line.

12. The wind turbine of claim 11, further comprising an electric generator having a generator input shaft, said generator input shaft connected to said second right angle drive output shaft.

13. The wind turbine of claim 10, wherein said load bearing foundation set in a ground.

14. The wind turbine of claim 9, further comprising a trailer, wherein said support tower having a height disposed between support tower top and bottom ends, wherein said upper platform coupled to said support tower top end, said support tower bottom end coupled to said trailer.

15. The wind turbine of claim 14, wherein said support tower bottom end rotatably coupled to said trailer to allow said support tower to be rotated between a tower operating condition having said support tower disposed in primarily vertical orientation to said trailer and a tower stowed condition having said tower disposed in primarily horizontal relation to said trailer, said tail vane disposed in said tail vane assembly disposed in said tail assembly stowed condition.

* * * * *